US008840941B2

(12) United States Patent
Parvez

(10) Patent No.: US 8,840,941 B2
(45) Date of Patent: Sep. 23, 2014

(54) METHOD FOR INFUSING CALCIUM PHOSPHATE IN WATER, JUICES AND WATER BEVERAGES

(76) Inventor: Rifat Parvez, Skillman, NJ (US)

( * ) Notice: Subject to any disclaimer, the term of this patent is extended or adjusted under 35 U.S.C. 154(b) by 687 days.

(21) Appl. No.: 12/885,679

(22) Filed: Sep. 20, 2010

(65) Prior Publication Data
US 2011/0027422 A1 Feb. 3, 2011
US 2013/0266694 A9 Oct. 10, 2013

Related U.S. Application Data

(63) Continuation-in-part of application No. 11/476,526, filed on Jun. 28, 2008, now abandoned, which is a continuation-in-part of application No. 10/425,093, filed on Apr. 28, 2003, now abandoned.

(51) Int. Cl.
| | |
|---|---|
| *A23L 2/00* | (2006.01) |
| *A23L 2/52* | (2006.01) |
| *A23L 2/56* | (2006.01) |
| *A23F 3/14* | (2006.01) |
| *A23F 3/16* | (2006.01) |
| *A23L 1/304* | (2006.01) |

(52) U.S. Cl.
CPC . *A23L 1/304* (2013.01); *A23L 2/52* (2013.01); *A23V 2002/00* (2013.01); *A23F 3/14* (2013.01); *A23F 3/163* (2013.01)
USPC .............................. 426/66; 426/74; 426/590

(58) Field of Classification Search
USPC ..................... 426/519, 590, 74, 66
See application file for complete search history.

(56) References Cited

U.S. PATENT DOCUMENTS

| | | | |
|---|---|---|---|
| 3,558,325 A * | 1/1971 | Recsei ................. | 426/534 |
| 3,949,098 A | 4/1976 | Bangert | |
| 4,214,996 A | 7/1980 | Buddemeyer et al. | |
| 4,497,800 A | 2/1985 | Larson et al. | |
| 4,737,367 A | 4/1988 | Langer et al. | |
| 5,151,274 A | 9/1992 | Saltman et al. | |
| 6,071,547 A | 6/2000 | Schechter | |
| 6,235,322 B1 | 5/2001 | Lederman | |
| 6,468,568 B1 * | 10/2002 | Leusner et al. ............ | 426/72 |
| 2003/0049352 A1 | 3/2003 | Mehansho et al. | |
| 2004/0213873 A1 * | 10/2004 | Parvez ..................... | 426/66 |

OTHER PUBLICATIONS

Manufacturer's data sheets of Wenda International Trade Co., Ltd., Dalian China 116600, for Mono Phospho Glycine (Glycine Phosphate, Amino acetic acid phosphate) and Citro Glycine (Glycine Citrate, amino acetic acid citrate).
Manufacturer's data sheets of Chiyuen International Trading Limited, Shenzhen, China 518040 for Glycine Phosphate and Glycine Citrate.
The American College Dictionary, definition of "infusing" Barnhart, ed., published by Random House, NY, p. 624 (1970).
M. Hambidge. "Human Zinc Deficiency", American Society of Nutritional Sciences, pp. 13445-13495, (2000).
D.A. Newsome et al., "Oral Zinc in Macular Degeneration". Archives of Ophthalmology. (1988), vol. 106, Ne. 2, pp. 192-198, (1988).
M. Lipkin et al, Effect of Added Dietary Calcium on Colonic Epithelial-Cell Proliferation in Subjects at High Risk for Familial Colonic Cancer, The New England Journal of Medicine. (1985), vol. 313, No. 22, pp. 1381-1384.
J, A. Baron et al, "Calcium Supplements for the Prevention of Colorectal Adenomas", The New England Journal of Medicine, (1999), vol. 340. No. 2, pp. 101-107.
Bo Lonnerdal. "Zinc and Health: Current Status and Future Directions", American Society for Nutritional Sciences, (2000), pp. 13785-13835.
L. Bell et al., "Cholesterol-Lowering Effects of Calcium Carbonate in Patients with Mild to Moderate Hypercholesterolemia", Arch. Intern. Med. (1992), vol. 152, pp. 2441-2444.
P S Allender et al. "Dietary Calcium and Blood Pressure: A Meta-Analysis of Randomized Clinical Trials", Ann. Intern. Med., (1996), vol. 124, pp. 825-831.
Y.N. Berner et al.. "Consequences of Phosphate Imbalance," Ann. Rev. Nutr., (1988), vol. 8. pp. 121-148.
J. M. Berg et al,. "The Galvanization of Biology: A Growing Appreciation for the Roles of Zinc", Science, (1996), vol. 271, pp. 1082-1086.
R.M. Bostick et al., "Effect of Calcium Supplementation on Serum Cholesterol and Blood Pressure," (2000), vol. 9, pp. 31-40.
R. B. Kreider et al, Effects of Phosphate Loading on Metabolic and Myocardial Responses to Maximal and Endurance Exercise Sport Nutrition, (1992), vol. 2. pp. 20-47.

* cited by examiner

*Primary Examiner* — Nikki H Dees
*Assistant Examiner* — Stephanie Cox
(74) *Attorney, Agent, or Firm* — Greenblum & Bernstein, P.L.C.

(57) ABSTRACT

The present invention provides a method to solubilize and infuse calcium phosphate directly into water, water beverages and juices at very high concentration from which it is readily available for immediate and complete absorption. A premix of powdered ingredients including ground limestone, amino acetic acid phosphate, amino acetic acid citrate and optionally zinc carbonate, acidulants sweeteners and/or flavors can be mixed with the water, water beverages and juices. The water, water beverages and juices containing infused calcium phosphate do not require further processing and are readily consumable.

9 Claims, No Drawings

US 8,840,941 B2

METHOD FOR INFUSING CALCIUM PHOSPHATE IN WATER, JUICES AND WATER BEVERAGES

CROSS REFERENCE TO RELATED APPLICATION APPLICATIONS

This application is a continuation-in-part of U.S. patent application Ser. No. 11/476,526, filed Jun. 28, 2006, abandoned, which is a continuation-in-part of U.S. patent application Ser. No. 10/425,093, filed Apr. 28, 2003, abandoned, the entireties of which are each hereby incorporated by reference into this application.

BACKGROUND OF THE INVENTION

Calcium is a mineral that is essential for life, yet millions of people do not get adequate assimilable calcium on a daily basis. Calcium plays an important role in building stronger, denser bones early in life and keeping bones strong and healthy later in life. Almost 99 percent of the calcium in the body is found in bones and teeth as calcium phosphate. In addition to building and maintaining strong, healthy bones, calcium is crucial for blood coagulation, energy production, glandular secretions, beating of the heart, nerve conduction, muscle contraction, maintenance of the immune system and more.

Each day our bodies lose calcium through skin, nails, hair, sweat, urine and feces. The human body cannot produce calcium on its own and it must be supplied through the diet and/or supplements. When the diet and supplements do not provide enough calcium for the body's needs, it is withdrawn from the bones. Bone is a living, growing tissue made of collagen and polysaccharides that form a soft and flexible framework. Embedded in this framework is a mineral called calcium phosphate ("the bone mineral") that imparts to the bone its structural strength. Over the long term, continual insufficient calcium intake and withdrawal from the bones causes the bones to weaken and prone to fractures, a condition called osteoporosis. Osteoporosis is defined as weakening of the bones leading to fractures. Since 99 percent of the body's calcium is found in bones and teeth, depletion of calcium phosphate from bones leads to osteoporosis.

Research has shown that both calcium and phosphorus are essential to support bone health, growth and development, *Bone* 32 (2003), 532-540. Calcium phosphate provides the calcium and phosphorus. Numerous calcium products are available as nutritional supplements. Almost all of these supplements contain calcium carbonate and a few are made with calcium citrate. Neither of these minerals is soluble and therefore lacks adequate bioavailability. None of the supplements of which applicant is aware provides calcium phosphate, which is also completely insoluble. The availability and absorption of calcium from these supplements is less than 30 percent of the Recommended Daily Intake (RDI), *Nutrition in Clinical Practice*, 22:286-296, June 2007. This lack of absorption is mainly due to the lack of adequate solubility of these supplements in the stomach.

Attempts have been made to increase the solubility of calcium in vitro. These attempts have resulted in powdered forms of multi mineral compositions containing very small amounts of calcium. Additionally, these compositions are only sparingly soluble in water. No prior art of which applicant is aware teaches of solubilizing and infusing the bone mineral calcium phosphate directly into water or water beverages.

Calcium assimilation by the body has been and continues to be a major issue in its efficacy, especially knowing that the body cannot absorb calcium unless it is in solution, *European Journal of Clinical Nutrition*, 51:13-16, 1997.

As stated above, the absorption of calcium from currently available supplements is less than 30 percent under ideal stomach conditions. Reducing this less-than-optimal absorption even further are powerful antacid drugs, both prescription and over-the-counter medications, *Digestive Disease Week Meeting*, Chicago, Jun. 1, 2009. These drugs (known as Proton Pump Inhibitors or PPIs) work by reducing or eliminating stomach acid. This acid is critical to the dissolution of calcium supplements and their absorption. Most recently published research reports that prolonged PPI use is associated with increased rate of bone fractures, *Archives of Internal Medicine*, Vol. 170 No. 9, May 2010.

It is desirable to provide a method to solubilize and infuse high levels of calcium phosphate directly into water, water beverages and juices from which it is available for immediate and complete assimilation and full efficacy irrespective of the acid content of the stomach.

SUMMARY OF THE INVENTION

The present invention relates to the technology for the solubilization and infusion of calcium phosphate directly into water, water beverages and juices and the method for producing and delivering the same. Calcium phosphate, known as the bone mineral, imparts structural strength to bones and is critical in maintaining bone density and strength and to prevent osteoporosis.

Bone is a living, growing tissue made of collagen and polysaccharides that form a soft and flexible framework. Embedded in this framework is the mineral calcium phosphate that imparts to the bone its structural strength. Much like building a structure with bricks and blocks requires mortar for imparting cohesion, strength and rigidity, calcium phosphate is the 'mortar' in the bones. Inadequate intake of calcium (calcium phosphate) through diet and/or supplements forces the body to draw calcium from the bones. Since 99 percent of the body's calcium is found in bones and teeth, continual withdrawal leads to low bone mass and fractures, a condition called osteoporosis. Since the human body cannot produce calcium on its own, it is imperative that calcium be supplied through diet and/or supplements. Conventional supplements are available and contain either calcium carbonate or calcium citrate. Calcium carbonate is by far the most commonly used mineral. It is 1) the least expensive, 2) most abundant, 3) naturally occurring and 4) contains the highest percentage of elemental calcium. Calcium citrate by comparison is mostly synthetic, more expensive and contains about half as much elemental calcium. Neither of these minerals are soluble in water. Therefore, after ingestion of calcium carbonate or calcium citrate tablets (the most common supplement form), the dissolution and absorption of calcium is less than 30 percent of the labeled amount under ideal stomach conditions. The most prevalent labeled amounts are 500 mg (50% of the RDI) and 600 mg (60% of the RDI) of elemental calcium for tablets made with calcium carbonate and much less for calcium citrate tablets. Only one or two of the supplements available contain the bone mineral calcium phosphate but in much smaller amounts. This mineral too is insoluble in water and has also been shown to provide less than 30 percent absorption after ingestion of tablets, *A Study from Stauffer Chemical Company*, Farmington, Conn. 1980.

The term "percentage elemental" used herein means the percentage of calcium present in the compound used in making the supplement. In its pure form, calcium carbonate contains 40 percent of elemental calcium. This means that for the supplement tablet to supply 500 mg or 600 mg of elemental calcium, the tablets must contain 1250 mg or 1500 mg of the pure calcium carbonate respectively. In its pure form, calcium carbonate does not possess inherent cohesion to bind together into a tablet. Therefore, as available for use in making nutritional tablets, calcium carbonate contains 36-37 percent of elemental calcium. Other ingredients needed to formulate this into tablets render the tablets very large and difficult to swallow. At about 28 percent absorption, the number of tablets needed for 100 percent of the RDI is 6-7 every day. Since calcium citrate contains about half as much elemental calcium as calcium carbonate, 12-14 tablets would supply the RDI of calcium.

As used herein, the term "ideal stomach conditions" mean the presence of hydrochloric acid and whether the tablets are taken with food. The tablets can be planned to be taken with food, however, the acid conditions in the stomach cannot be controlled. It has been shown by recently published research that powerful antacid drugs, both prescription and over-the-counter medications have resulted in increased incidence of bone fractures. These powerful antacid medications known as Proton Pump Inhibitors or PPIs work by reducing or eliminating stomach acid. Stomach acid is required to dissolve calcium minerals into ionized (solubilized) and absorbable forms. The reduction or elimination of stomach acid reduces the already less-than-optimal calcium absorption even further.

The present invention provides the technology to solubilize and infuse the bone mineral calcium phosphate directly into water, water beverages and juices in high concentration such that two 20 oz (591 mL) servings provide 100 percent of the daily requirement of calcium and 70% of phosphorus. After infusion of calcium phosphate into water, water beverages and juices, these beverages remain clear, provided the water beverages and juices used were clear before use. The term "clear" used herein means transparent and with no turbidity. Since the calcium phosphate in the infused water, water beverages and juices is already in solution, upon ingestion it is available for immediate and complete absorption and full efficacy irrespective of the acid content of the stomach or time of consumption. In this regard it provides extremely important benefit to people who are required to regularly take Proton Pump Inhibitor medications.

Additionally, one or more water soluble vitamins, vitamin D, zinc, folic acid, herbal ingredients and/or extracts thereof, sweeteners and flavors can be added with calcium phosphate for direct infusion into water, water beverages and juices. Preservatives can also be added but more preferably the infused water, water beverages and juices are sterilized by heating.

The technology of the present invention also allows for the ingredients to be mixed with tea leaves and bagged. The action of hot water poured onto the tea bag infuses the calcium phosphate directly into the brewed tea which retains its color, aroma, texture and taste.

The water, water beverages, juices and teas produced using the technology of the present invention are designed specifically to help prevent osteoporosis by supplying 100 percent absorbable and effective bone mineral calcium phosphate and at the same time provide healthful hydration.

DETAILED DESCRIPTION OF THE INVENTION

The invention relates to end product(s) resulting from the method of the present invention including water, water beverages and juices into which have been infused the bone mineral calcium phosphate. These resulting beverages do not require any further processing and are readily consumable.

The starting materials comprise ingredients in powder form as a premix of pure ground limestone, amino-acetic acid phosphate and amino-acetic acid citrate. The term "powders" as used herein means ingredients whose particles are preferably in the range of about 50 to about 100 microns in size, but can be smaller or larger than the preferred range. These ingredients must meet the quality standards established by the Food Chemicals Codex but more preferably by the United States Pharmacopoeia. A required amount of the powdered premix is added to water, water beverage or juice at room temperature. As the premix is added, the water, water beverage or juice is stirred at a moderate speed. The ingredients can be added individually, but more preferably as the premix. Water can be tap water, purified, de-ionized, carbonated, distilled or reverse osmosis treated. More preferably, the water used is purified tap water. Room temperature used in the present invention means temperature in the range of about 45 degrees F. to about 70 degrees F. Preferably temperature of about 55 degrees F. to about 60 degrees F. is used.

As the ingredient premix is added to water, water beverage or juice, a chemical reaction at room temperature converts the limestone into dissolved calcium phosphate that is irreversibly infused in the beverage. No energy in the form of heat is required for the reaction. The reaction also produces dissolved calcium citrate and amino-acetic acid. The mixing time can be about 10 minutes to about 45 minutes but more preferably about 20 minutes.

The calcium phosphate infused in the water imparts a tart taste. The water beverages and juices are not so affected. The acidic taste in the water is overcome by the addition of acidulants, sweeteners, flavors, and the like. "Acidulants" that can be added, but are not limited to include citric acid, malic acid, lactic acid, sodium citrate and potassium citrate. Examples of preferred sweeteners include sucralose, acesulfame potassium, aspartame, saccharin and stevia, either singly or in combinations. As used herein, the term "flavors" includes both fruit and botanical flavors. Included within the term flavors are synthetically prepared flavors and those derived from natural sources.

The acidulants and sweeteners can be added to the premix. Optionally, additional ingredients can also be added to the premix at this stage before adding to water, water beverage or juice. Additional ingredients include but are not limited to, one or more vitamins, zinc, folic acid, herbal ingredients and/or extracts thereof. After the preferred mixing time and completion of the reaction, flavor(s) are added and mixing continued for an additional period of time, preferably about 10 minutes.

The proportion of limestone, amino acetic acid phosphate and amino acetic acid citrate in the premix can be controlled to yield a high concentration of elemental calcium in the infused water, water beverages and juices of this invention. High concentration, as defined by the Food and Drug Administration refers to more than 20% of calcium. The amount of elemental calcium in the infused water, water beverage and juice can be about 20% to about 150% per serving but more preferably about 50% or about 500 mg of calcium. As used herein, "per serving" refers to the volume of infused beverage of the present invention that must be consumed to provide the labeled amount of calcium and phosphorus. For example, serving size can vary between about 8 oz and about 32 oz. Preferably, the serving size is about 20 oz.

After completion of the reaction of the premix in water, water beverage or juice and the mixing of the flavor(s), the infused beverage is ready for preservation/sterilization. The sterilization step of the present invention can be accomplished by the use of preservatives/antimicrobial agents or heat. As used herein, the term "preservative/antimicrobial agents" includes, but is not limited to, sodium benzoate, potassium benzoate, benzoic acid, ethylparaben, methylparaben, propylparaben, sorbic acid and the like. More preferably sterilization is accomplished by heating the infused beverage at high temperature. Heating can be conducted in a heat exchanger or jacketed steam kettle. More preferably heating is done in a heat exchanger to provide for faster and continuous processing. The infused water, water beverages or juices of the present invention are heated to between about 160° F. to about 210° F. but more preferably at about 185° F. to about 195° F. In the heat exchanger, the infused water, water beverage or juice is rapidly heated to the desired temperature using steam as the heating medium and maintained at this temperature during packaging. The residence time in the heat exchanger is about 60 seconds to about 300 seconds but more preferably about 60 seconds to about 120 seconds. After bottling, the bottles are cooled to room temperature and refrigerated for consumption.

The infused water, water beverages or juices of the present invention are extremely stable and can be packaged in polyethylene terephthalate (PET) or glass bottles and/or jugs. Bottles and/or jugs can be clear or tinted. No oxygen barrier is required.

The existing water beverages and juices used in this invention include but are limited to, SEVEN-UP®, seltzer waters, SPRITE®, CRYSTAL LITE® lemonade, KOOL-AID®, iced tea, green tea, apple juice, pomegranate juice, white grape juice and white cranberry juice. Most of these water beverages and all the juices selected were clear solutions and were intended to demonstrate that their clarity is maintained after infusion of the bone mineral-calcium phosphate. Since all the water beverages and many juices already contain acidulants, sweeteners, and preservatives, these ingredients can be excluded from the premix. All the beverages listed above were pre-flavored, therefore no flavors were added. After completion of the reactions, the infused beverages were re-sterilized and repackaged. These water beverages and juices were heated in a stainless steel vessel on a laboratory burner to the same temperature and for the same length of time as discussed above. These beverages were repackaged hot in PET containers and allowed to cool to room temperature before refrigeration. In each of the water beverage and juice infused by the technology of this invention, the serving size was maintained at 20 oz and the elemental calcium and phosphorus contents were maintained at about 50% and about 35% respectively of the Recommended Daily Intake (RDI). No change was observed in their color, clarity, flavor, taste or texture.

In another embodiment of the present invention, the premix comprises zinc carbonate, amino acetic acid citrate, acidulants and sweetener(s). The proportion of zinc carbonate and amino acetic acid citrate can be controlled to yield the elemental zinc concentration of about 10% to about 150% but more preferably about 50%. After adding the premix to water, water beverage or juice, a chemical reaction at room temperature converts the zinc carbonate into ionized zinc which is irreversibly infused in the beverage. The reaction also produces amino acetic acid which helps mellow the acidic taste. All procedures listed above are followed. The serving size can be about 8 oz to about 24 oz, but more preferably about 16 oz. In the case of water, a suitable flavor can be added as discussed above. Water beverages and juices are pre-flavored and do not need additional flavor(s).

In another embodiment of the present invention, a premix comprising pure ground limestone, amino acetic acid phosphate, amino acetic acid citrate, zinc carbonate and optionally, sweetener(s) can be added to tea bags for hot brewing (or infusion). Because of the smaller serving size (approximately 10 oz) of hot tea, the composition of the premix can be adjusted to supply about 20% to about 50% of elemental calcium and zinc. More preferably the premix composition is adjusted to supply about 25% of the RDI of calcium and zinc, for example, 250 mg and 3.75 mg respectively. The type of tea used, but is not limited to, included black tea, green tea and white tea.

Twenty five tea bags each of black tea, green tea and white tea were used. Two different brands of black tea that were used were regular breakfast tea. Green tea and white tea were already respectively flavored with lemon/ginseng and tangerine. Bags of each type of tea were carefully opened to remove the contents which were weighed to obtain the average content weight of each bag. To the tea bag contents was added the appropriate amount of the premix and thoroughly blended in a small closed container. Each bag was then refilled with the correct amount of the blend, carefully closed and re-stapled. When hot water was poured over the tea bag, solubilization and infusion of calcium phosphate and zinc begins immediately along with brewing of the tea. The reaction is complete within the brewing time of the tea as specified on each tea bag package, typically about 3 minutes to about 4 minutes. Hot tea infused with calcium phosphate and zinc is produced that does not require any additional ingredients. To suit individual taste, sweetener can be added, if not already included in the premix.

In another embodiment of the present invention, a premix comprising pure ground limestone, amino acetic acid phosphate, amino acetic citrate, zinc carbonate, acidulants, sweeteners and flavors can be added to tea already brewed from fresh tea leaves. The type of tea used, but is not limited to, was black breakfast tea. The loose tea leaves, equivalent to the amount of tea in a tea bag, were brewed in about 20 oz of boiling water for a period of time as specified on the tea container, typically about 3 minutes to about 4 minutes and cooled to room temperature. The premix was added and mixed. The mixing time can be about 10 minutes to about 45 minutes but more preferably about 20 minutes. The calcium phosphate and zinc infused tea is heated for sterilization at a temperature previously discussed, bottled, cooled and chilled for consumption. The serving size was maintained at about 20 oz and the elemental calcium, phosphorus and zinc contents were maintained at about 50%, about 35% and about 50% respectively of the RDI.

In another embodiment of the present invention, a premix comprising pure ground limestone, amino acetic acid phosphate and amino acetic acid citrate and optionally zinc carbonate, can be combined with powdered drink mixes for reconstitution in water. The composition of the premix can be maintained for about 20 oz serving size as discussed above such that each about 8 oz of the reconstituted drink will provide about 200 mg of calcium and about 140 mg of phosphorus and optionally about 3.75 mg of zinc. The commercially available powdered drink mixes used included, but are not limited to KOOL-AID®, CRYSTAL LIGHT®, LIPTON® ICED TEA TO-GO, AND LIPTON® GREEN TEA TO-GO. All powdered drink mixes used already contained acidulants, sweeteners and flavors and were therefore not needed in the premix. However, any or all of these ingredients can be included if needed.

The water, water beverages and juices infused by the technology of the present invention are extremely stable.

The waters containing the infused bone mineral-calcium phosphate- and zinc remained completely clear and free of turbidity or appearance of any particle settlement for at least about forty eight (48) months. Periodic analyses have not shown any change in chemical composition, microbiology, taste or flavor.

Water beverages and juices have maintained their integrity for at least about twenty four months. These beverages, if clear, have remained clear and free of turbidity while maintaining their tastes, colors and flavors.

The invention can be further illustrated by the following examples thereof, although it will be understood that these examples are included merely for purposes of illustration and are not intended to limit the scope of the invention unless otherwise specifically indicated. All percentages, ratios, and parts herein, in the Specification, Examples, and Claims, are by weight and are approximations unless otherwise stated.

EXAMPLE

Comparative Bioavailability and Effect on Bone Density

A laboratory study was conducted to compare the relative affects of the calcium phosphate infused water of this invention and calcium carbonate powder on bone development in young, growing rats. Ten male weanling Sprague-Dawley derived albino rats each weighing 70-80 grams were used in each group. All animals were fed the same basal diet. Control group received calcium from calcium carbonate powder incorporated in the diet. Drinking water was provided ad-libitum. Test group was provided the calcium phosphate-infused water of this invention calculated to contain the same amount of elemental calcium as the control group. The calculated volume of the calcium phosphate-infused water was lower than the volume of the drinking water consumed by the control group. The difference was made up by adding drinking water to it. Food consumption, volume of drinking water, volume of calcium phosphate-infused water of this invention and animal weights were recorded daily. At the end of thirty days the animals were sacrificed and both femurs from each animal were removed for evaluation. Results show that bone mineral density, tensile strength, femur ash, calcium and phosphorus contents were all much higher in the test group compared to the control. Bone density and strength were significantly higher for the test group. Additionally, on day 30, test group animals showed significantly lower individual mean body weight gain.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A process for solubilizing calcium, phosphorous and zinc into a clear water composition for human consumption comprising:
    mixing ingredients comprising calcium carbonate, glycine phosphate, glycine citrate, and zinc carbonate with water to obtain a clear solution
    wherein
    the calcium carbonate and the glycine phosphate react to yield dissolved calcium phosphate and glycine,
    the calcium carbonate and the glycine citrate react to yield dissolved calcium citrate and glycine, and
    the zinc carbonate and glycine citrate react to yield dissolved zinc citrate and glycine.

2. The process of claim 1 wherein stoichiometric ratios of glycine phosphate and calcium carbonate are mixed in the water to obtain dissolved calcium phosphate and glycine.

3. The process of claim 2 wherein stoichiometric ratios of calcium carbonate and glycine citrate are mixed in the water to obtain dissolved calcium citrate and glycine, and stoichiometric ratios of zinc carbonate and glycine citrate are mixed in the water to obtain dissolved zinc citrate and glycine.

4. The process of claim 1 further comprising admixing said ingredients with tea.

5. The process of claim 1 wherein said clear solution is bottled.

6. The process of claim 1 wherein said clear solution supplies 500 mg calcium, 7.5 mg zinc, and 350 mg phosphorus per 20 ounces.

7. The process of claim 1 further comprising admixing at least one member selected from the group consisting of sweeteners, flavors, and vitamins with the water.

8. The process of claim 1 further comprising admixing at least one member selected from the group consisting of fruit and botanical flavors, sugars, and sweeteners with the water.

9. The process of claim 1 wherein the clear solution supplies 500 mg of calcium per 20 ounces.

* * * * *